United States Patent
Dils et al.

(10) Patent No.: US 7,150,587 B2
(45) Date of Patent: Dec. 19, 2006

(54) HAND-HELD TOOL CONTAINING A REMOVABLY ATTACHABLE OBJECT SENSOR

(75) Inventors: Jeffrey M. Dils, Simpsonville, SC (US); Kenneth M. Brazell, Piedmont, SC (US)

(73) Assignee: Eastway Fair Company Limited (VG)

( * ) Notice: Subject to any disclaimer, the term of this patent is extended or adjusted under 35 U.S.C. 154(b) by 0 days.

(21) Appl. No.: 10/822,321

(22) Filed: Apr. 12, 2004

(65) Prior Publication Data

US 2004/0265079 A1 Dec. 30, 2004

Related U.S. Application Data

(63) Continuation of application No. 09/993,177, filed on Nov. 16, 2001, now abandoned, which is a continuation-in-part of application No. 09/501,194, filed on Feb. 10, 2000, now Pat. No. 6,364,580.

(51) Int. Cl.
*B23B 45/00* (2006.01)
(52) U.S. Cl. .............................. 408/16; 324/67; 33/334
(58) Field of Classification Search ................ 439/607, 439/609, 188; 408/16, 124, 702; 173/2, 173/217, 218; 324/67, 671, 637; 33/334, 33/347, 377, 379; 310/47, 50
See application file for complete search history.

(56) References Cited

U.S. PATENT DOCUMENTS

| 4,564,322 A | 1/1986 | Stapley |
| 4,797,040 A | 1/1989 | Hibbard |
| 4,932,294 A | 6/1990 | Chang |
| 4,954,026 A | 9/1990 | Zurwelle |
| 4,973,205 A | 11/1990 | Spaulding |
| D331,356 S | 12/1992 | Amsberry |
| 5,170,545 A * | 12/1992 | Hubscher ................... 29/26 A |
| 5,196,818 A | 3/1993 | Anderson |
| 5,333,767 A | 8/1994 | Anderson |
| 5,361,504 A | 11/1994 | Huang |
| 5,405,004 A | 4/1995 | Vest et al. |
| 5,445,479 A | 8/1995 | Hillinger |
| 5,562,240 A | 10/1996 | Campbell |
| D386,662 S | 11/1997 | Tozawa et al. |
| 5,730,609 A * | 3/1998 | Harwath .................... 439/607 |
| 5,797,670 A | 8/1998 | Snoke et al. |
| 5,810,525 A | 9/1998 | Ector, Sr. |
| D409,467 S | 5/1999 | Chung |
| D411,947 S | 7/1999 | Sugimoto et al. |
| 5,954,458 A | 9/1999 | Lee |
| 6,264,408 B1 * | 7/2001 | Lung et al. ................ 409/182 |
| 6,301,997 B1 * | 10/2001 | Welte ............................ 81/54 |
| 6,364,580 B1 * | 4/2002 | Dils et al. ................... 408/16 |
| 6,851,487 B1 * | 2/2005 | Shotey .......................... 173/1 |
| 6,926,473 B1 * | 8/2005 | Luebke ........................ 408/16 |
| 6,979,155 B1 * | 12/2005 | Dils et al. ................... 408/16 |
| 2003/0218469 A1 * | 11/2003 | Brazell et al. ............. 324/637 |
| 2005/0111214 A1 * | 5/2005 | Zeiler ........................ 362/119 |

(Continued)

FOREIGN PATENT DOCUMENTS

DE    32 32 740 A    3/1984

(Continued)

*Primary Examiner*—Daniel W. Howell
(74) *Attorney, Agent, or Firm*—Brinks Hofer Gilson & Lione; G. Peter Nichols

(57) ABSTRACT

A hand-held power tool having a housing and a removably attachable portion. The removably attachable portion, which comprises an object sensor to detect studs hidden behind walls, electrical lines, and other materials, is readily accessible to tradesmen. A level may also be included on the removably attachable portion.

16 Claims, 5 Drawing Sheets

U.S. PATENT DOCUMENTS

2005/0230130 A1* 10/2005 Strasser et al. ................ 173/2
2005/0247460 A1* 11/2005 Luebke .......................... 173/2

FOREIGN PATENT DOCUMENTS

| DE | 3324615 A1 * | 5/1984 |
| DE | 299 04 877 U1 | 3/1999 |
| EP | 1036635 A2 * | 9/2000 |
| FR | 2 491 795 | 4/1982 |
| WO | WO 98/52723 A1 * | 11/1998 |

* cited by examiner

HAND-HELD TOOL CONTAINING A REMOVABLY ATTACHABLE OBJECT SENSOR

This application is a continuation of U.S. Ser. No. 09/993,177 filed on Nov. 16, 2000 now abandoned, which is a continuation-in-part of Ser. No. 09/501,194 filed on Feb. 10, 2000, U.S. Pat. No. 6,364,580, the entire contents of both are incorporated herein by reference.

BACKGROUND

1. Field of the Invention

The present invention relates to hand-held electric or pneumatic tools having a sensor removably attachable to the tool.

2. Background Art

Hand-held tools powered by electricity (corded (AC) or battery pack (DC)) or compressed air, such as drills, reciprocating saws, screwdrivers, and nailers are extensively used by electricians, plumbers, carpenters and others. Common tasks for such devices generally include drilling holes, driving fasteners such as screws, and cutting various materials. Some of these tasks require the use of drill bits and tool bits which are typically stored separately from the hand-held drill.

Frequently, building tradesmen are confronted with the task of finding some suitable structure, such as a stud, hidden behind a visible wall surface to securely hold a nail or screw. Various stud sensors have been developed to locate studs using, for example, electromagnetic means to sense a nail located in the stud or by measuring changes in the density of the wall. These sensors can also be used to locate conduit, exhaust vents, rebar, plumbing and other hidden material a tradesman may wish to avoid drilling or cutting into. More importantly, building tradesman have to drill holes or cut materials in the vicinity of "live" electrical lines. Various sensors have been developed to locate electrical wires, especially "live" wires. Further, other types of sensors have been developed to help tradesmen locate and distinguish different materials hidden behind walls. Collectively, these sensors are defined as object sensors.

While highly effective, one problem with such object sensors is that they are a separate piece of equipment that the tradesman may lose or merely not carry on him when he needs it. Prior art solutions have been to provide the workers with pouches and the like which can be worn about the workman's waist. While these pouches eliminate the need for the operator to leave the workplace to get the object sensor, the workman must remember to first place the object sensor in the pocket and then search the myriad of pockets to find the object sensor. Thus, a significant savings of time may not be realized.

Therefore, there exists a need for a device that combines a hand-held power (AC and/or DC) or pneumatic tool with a removably attachable object sensor.

SUMMARY OF THE INVENTION

Accordingly, an object of the present invention is to provide a hand-held power (AC and/or DC) or pneumatic tool having a removably attachable portion comprising an sensor.

In accordance with this and other objects, the present invention provides a hand-held power tool having a housing. The housing includes a drive mechanism connected to a rotary output shaft which is aligned along a tool axis. Further, a handle portion is aligned along a handle axis. The handle portion has a power activator switch thereon for activating the drive mechanism. A removably attachable portion comprising an object sensor is removably attached to the housing. The tool may be powered by electricity (AC and/or DC power) or compressed air.

In another embodiment, a hand-held drill comprises a battery pack.

A removably attachable portion containing the object sensor is removably attached to the battery pack.

The removably attachable portion may further comprise a level.

In another embodiment, the hand-held tool is a reciprocating saw having a drive mechanism and a housing. A removably attachable portion comprising an object sensor is removably attached to the housing. The reciprocating saw may be powered by electricity (AC or DC) or compressed air.

The above object and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
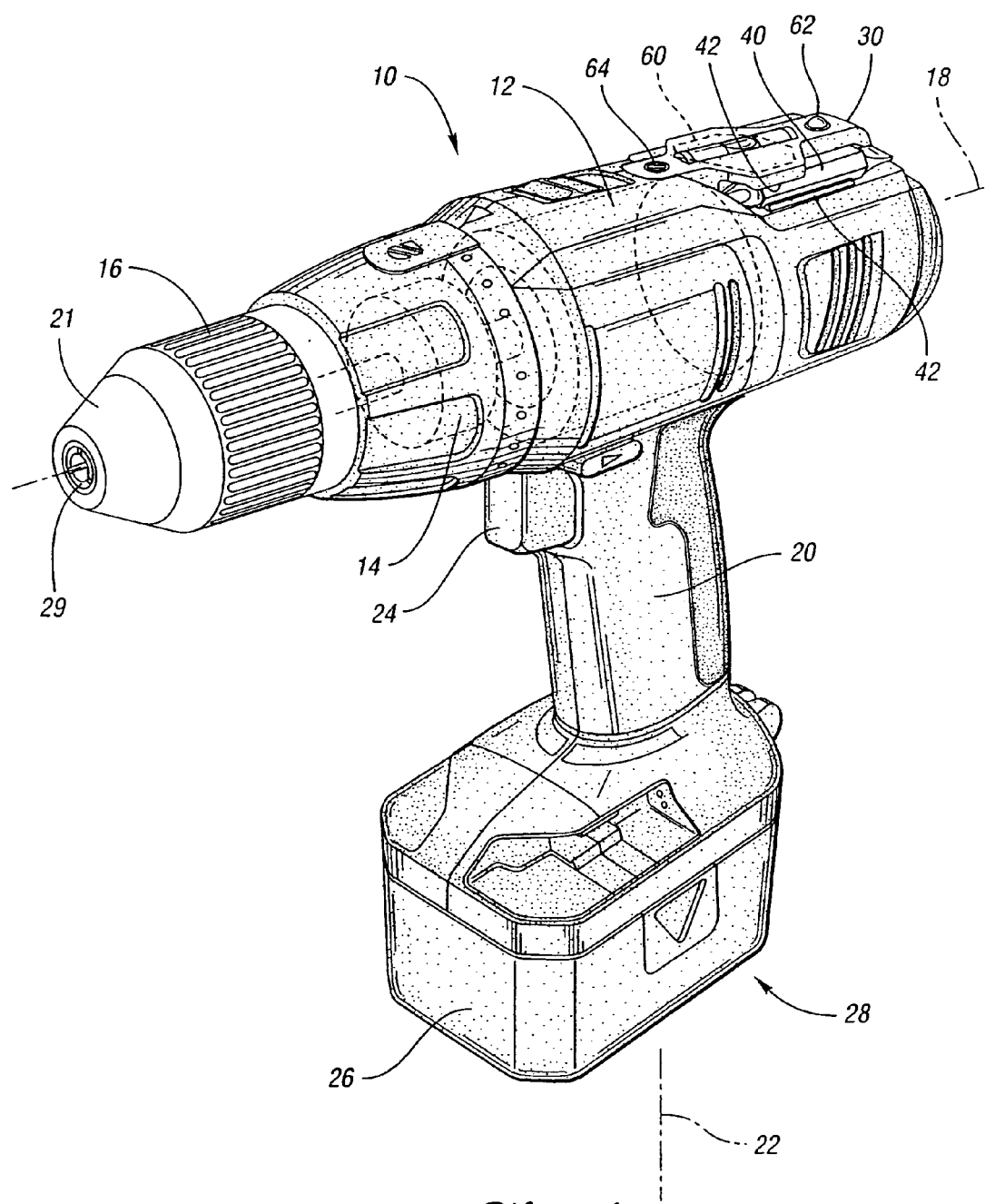
FIG. 1 is a perspective view of a hand-held power tool having a removably attachable portion comprising an object sensor, in accordance with the present invention.

Referring now to FIG. 1, an electric hand-held power drill 10 is shown. Power drill 10 has a housing 12 which accommodates a drive mechanism and motor 14 for driving a rotary output shaft 16. The drive mechanism, motor, and rotary output shaft are aligned along a tool axis 18. Housing 12 further includes a handle portion 20 for gripping the power tool 10, and directing a tool end 21 toward a workpiece. Handle portion 20 is aligned along a handle axis 22.

In operation, a tool such as a tool bit, drill bit, or similar device is coupled to the rotary output shaft 16 for working on a workpiece. The tool is removably coupled to rotary output shaft 16 using a chuck 29, as conventionally known. Chuck 29 may be keyless or require a key (not shown) to open and close the chuck. Common tasks performed by the tool and hand-held power drill combination include, for example, drilling holes and driving fasteners on and into the workpiece.

Figure 9:
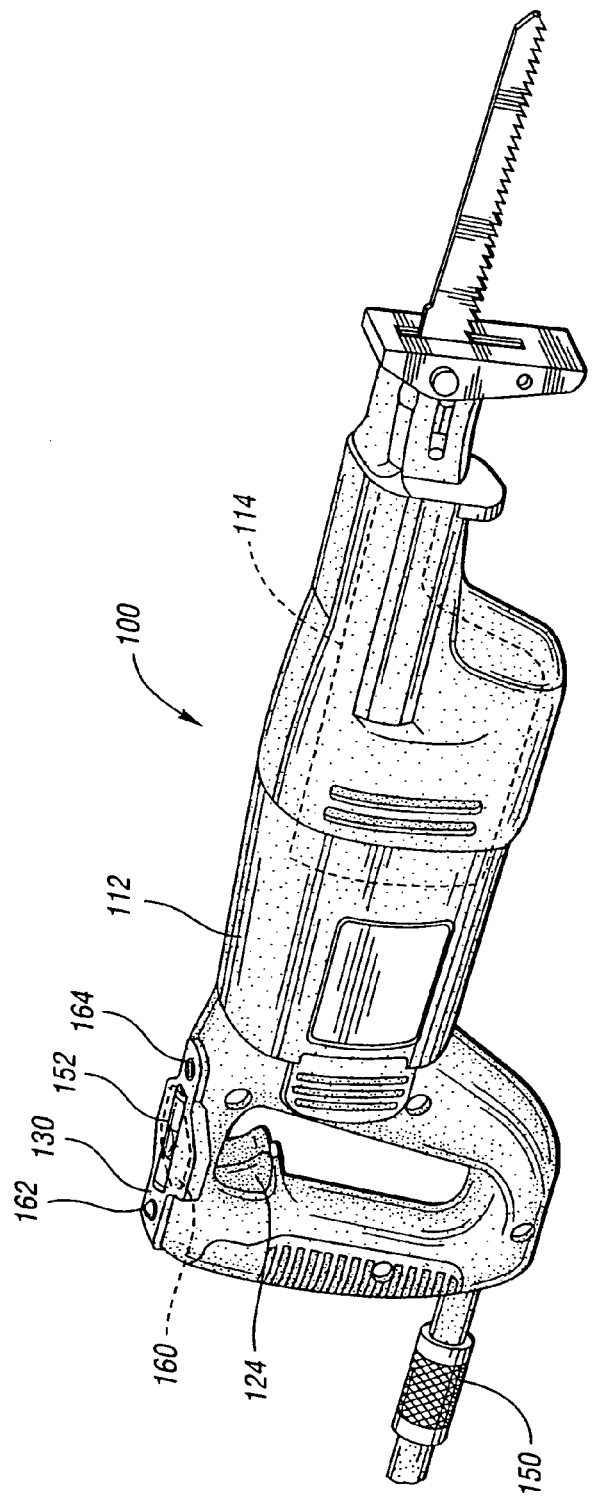
FIG. 9 is a perspective view of a reciprocating saw powered by compressed air having a removably attachable portion comprising an object sensor accordance with the present invention.

A power activation switch 24 is disposed on the handle for activating the drive mechanism and motor 14 to rotate the rotary output shaft. Preferably, a battery 26 is connected to the handle portion 20 at the power supply end 28 and provides electrical DC power to activate the drive mechanism and motor 14 for rotating the rotary output shaft 16. However, the present invention may be incorporated into corded power drills (not shown) supplying AC power as well. The term electric as used in this application means electric power by means of AC or DC power. Additionally, the present invention may be incorporated into compressed air-powered tools as well (as shown in FIG. 9). The drive mechanism 14 and power activation switch 24 for a compressed air-powered tool will be of a type known by those skilled in the art.

Figure 2:
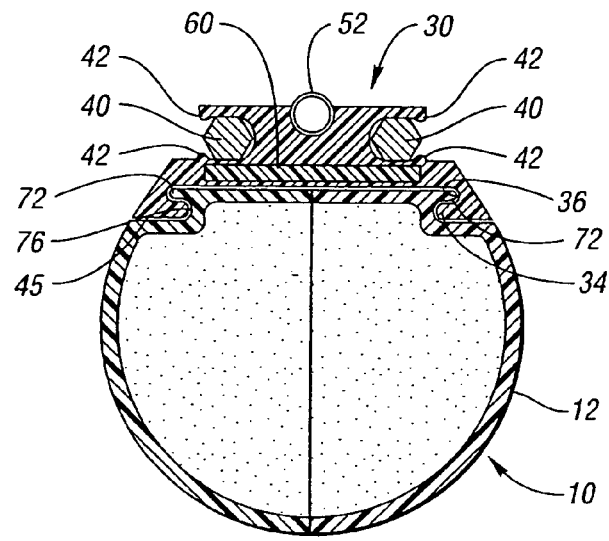
FIG. 2 is a cross-sectional of a hand-held power tool having a removably attachable portion having an object sensor therein, in accordance with the present invention.

In accordance with the preferred embodiment of the present invention, removably attachable portion 30 is illustrated showing it attached to drill 10 in both a perspective and cross-sectional view in FIGS. 1 and 2, respectively. The removably attachable portion 30 is slid onto housing 12 from the rear. Housing 12 may contain outwardly projecting flanges 72 which create grooves 76. Removably attachable portion 30 has inwardly projecting flanges 34 creating grooves 36. When the removably attached portion 30 is slid onto housing 12, the flanges 34 and 72 cooperate with grooves 36 and 76 to fix the removably attachable portion onto housing 12 as shown in FIG. 2. A detailed description of removably attachable portion 30 will be provided hereinafter.

Figure 3:
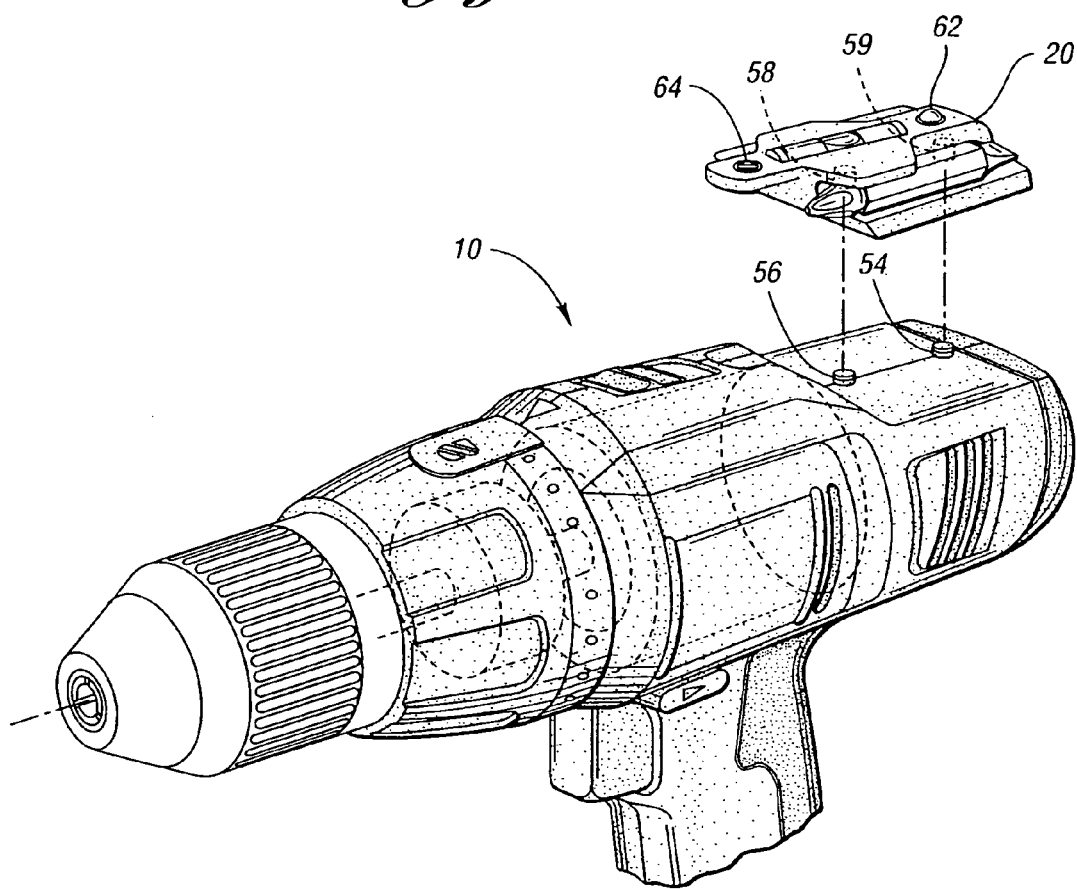
FIG. 3 is a perspective view of a hand-held power tool having a removably attachable portion having an object sensor and a level, in accordance with the present invention.

Alternatively, as shown in FIG. 3, the removably attachable portion 30 can be attached to the drill 10 using a pair of protrusions 54 and 56 extending upwards from housing 12. A pair of recesses 58 and 59 formed in the bottom of removably attachable portion 30 are sized to receive protrusions 54 and 56 and removably attach the removably attachable portion 30 to the housing 12. Conversely, the removable attachable portion 30 may comprise protrusions and the housing 12 may contain recesses to receive the protrusions. Other attachment schemes, known to individuals of ordinary skill in the art, which allow removably attachable portion 30 to be removably attached to housing 12 may also be used.

Figure 4:
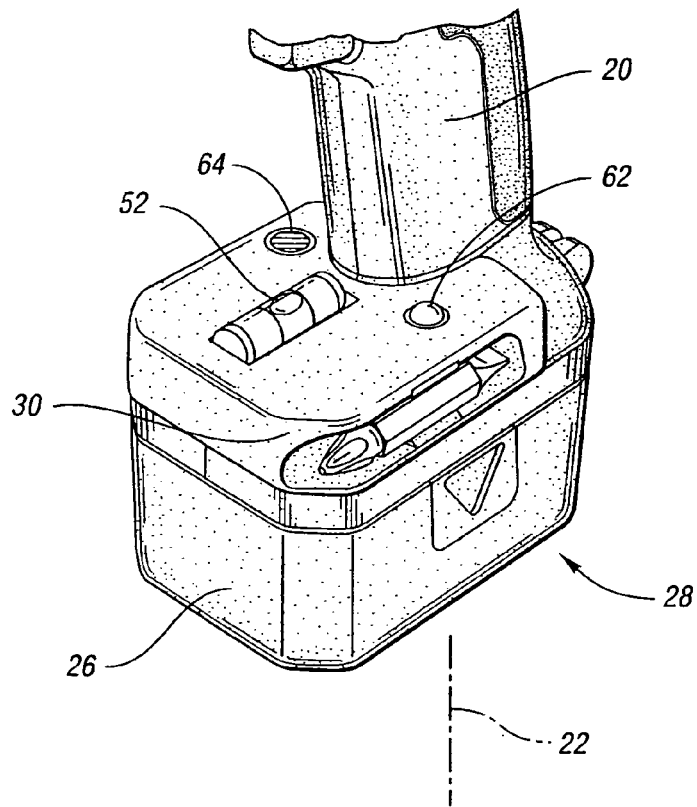
FIG. 4 is a perspective view of the power source end of a handheld power tool having a removably attachable portion having an object sensor and level, accordance with the present invention.
Figure 5:
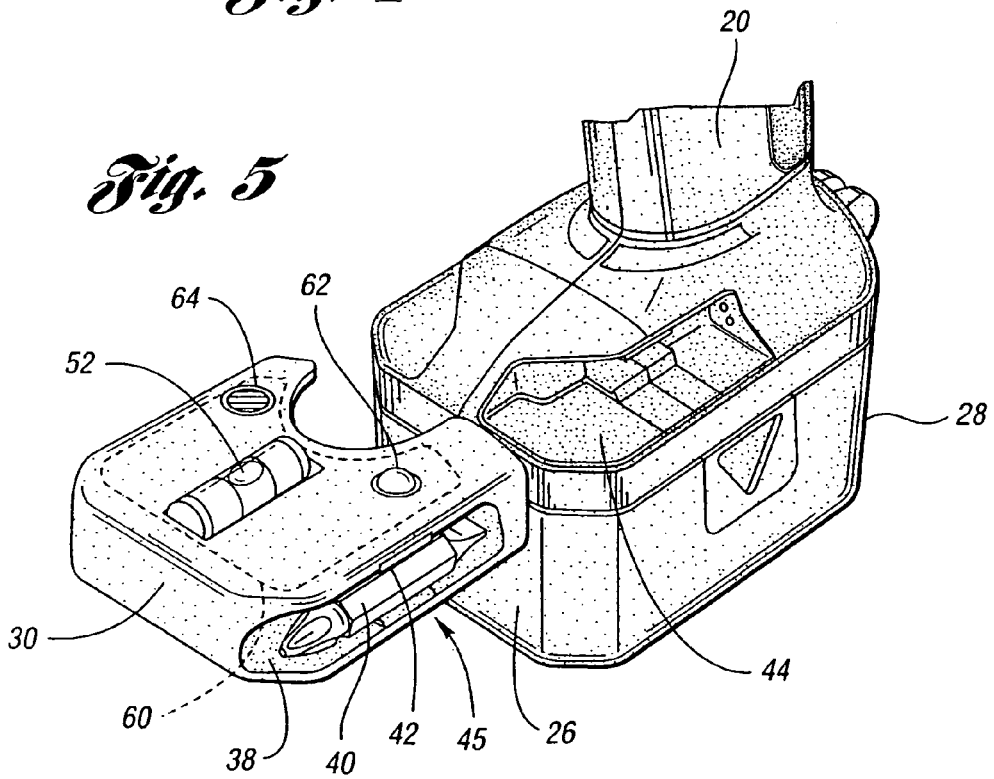
FIG. 5 is a perspective view of the power source end of a handheld power tool having a removably attachable portion having an object sensor and a level, in accordance with the present invention.

In an alternative embodiment illustrated in FIGS. 4 and 5, the removably attachable portion 30 is disposed at the power supply end 28 of the handle portion 20. Power supply end 28 has a pair of slots 44 configured to removably affix removably attachable portion 30 to housing 12. Removably attachable portion 30 has an underside 45 formed to fit slots 44 for removable attachment thereto.

Figure 7:
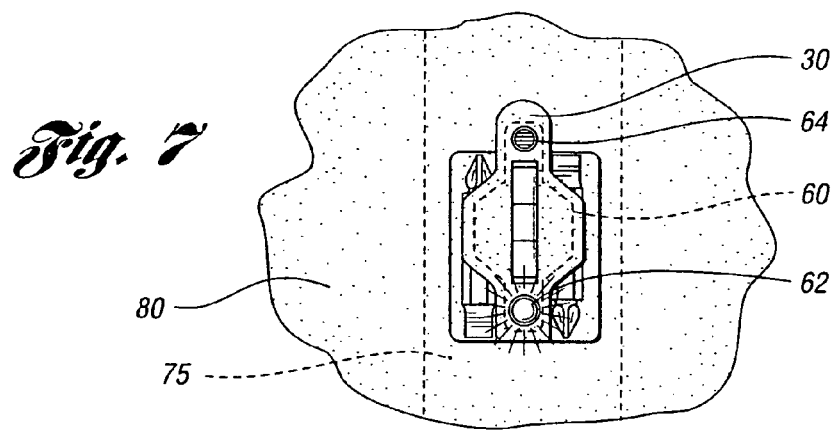
FIG. 7 is a top of the removably attachable portion having an object sensor in accordance with the present invention.

As best shown in FIGS. 2 and 5, removably attachable portion 30 includes an object sensor 60 for detecting studs hidden underneath drywall, electrical lines, conduit, pipe, various metals, rebar, and other hidden materials. The object sensor 60 is of a type commonly available. The object sensor 60 may include a visible light 62 which illuminates when the object sensor is placed over a stud as shown in FIG. 7. Further, the object sensor may comprise a speaker 64 which makes an audible sound when, for example, a stud or "live" wire is detected. Other features, such as meters, may also be included depending on the features of the object sensors. Additionally, removably attachable portion 30 may be configured with a level 52.

Removably attachable portion 30 also may be provided with a recess 38 for receiving tool bit 40 where the bit is captured in recess 38 by a detent formed by two opposing spring protrusions 42. Preferably, an identical recess 38 is disposed on the opposite side of removably attachable portion 30 having a detent formed by spring protrusions 42 for holding another tool bit 40 securely in place.

Figure 6:
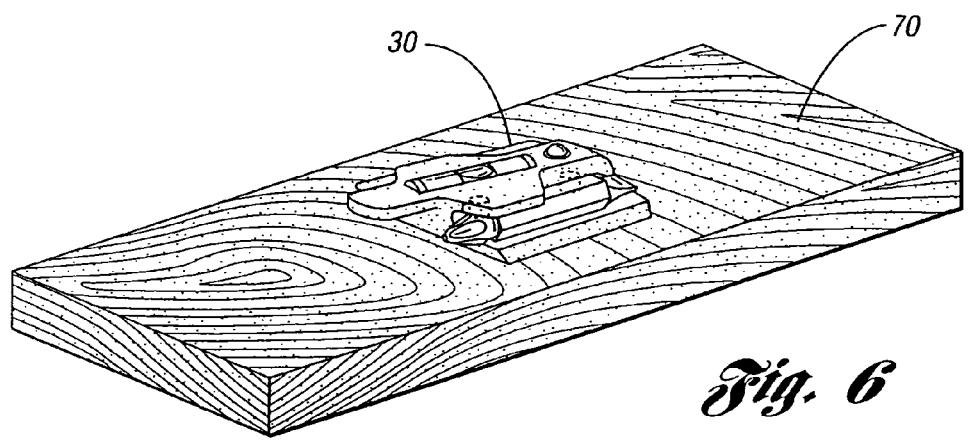
FIG. 6 is a perspective view of the removably attachable portion having a level on a piece of wood in accordance with the present invention.

In operation, the drill 10 of the present invention is used as a normal drill. When the tradesman must check the orientation of a surface, he can detach the removably attachable portion 30 from the drill and place it on a surface 70 as shown in FIG. 6. To locate a stud or other hidden materials, the removably attachable portion 30 is detached from drill 10 and moved along a surface 80 until stud 75 is located as shown in FIG. 7.

Figure 8:
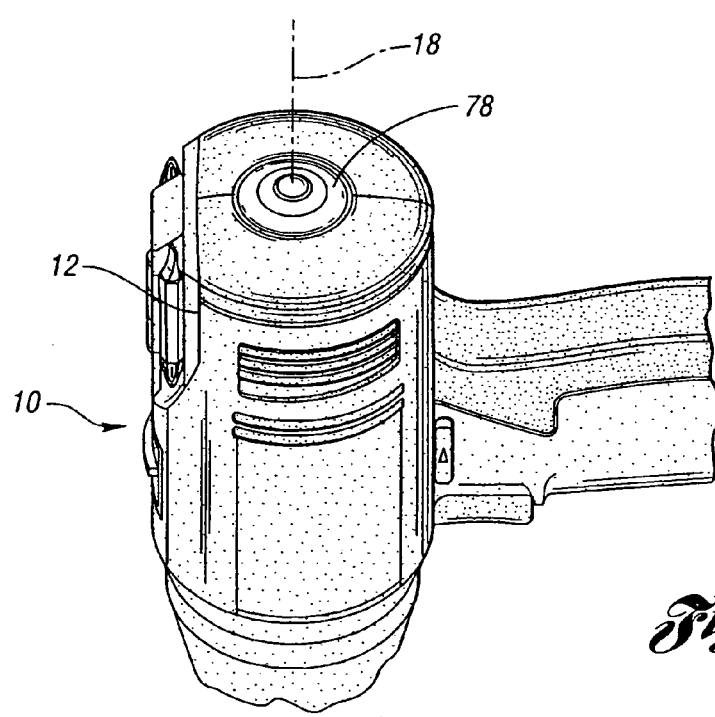
FIG. 8 is a perspective view of a hand-held power tool having a bull's eye level.

Additionally, as shown in FIG. 8, a bull's eye bubble level 78 is disposed at the rear end of housing 12 in a plane essentially perpendicular to tool axis 18 to indicate when the tool axis is vertical.

The present invention may also be incorporated onto other hand-held power tools such as a reciprocating saw (as shown in FIG. 9), a nailer, a power screwdriver, a circular saw, or a jigsaw. The tools may be powered by electric power (corded (AC) or battery operated (DC)), compressed air, or other means.

Referring now to FIG. 9, reciprocating saw 100 has a housing 112, and a drive mechanism 114. In this example, the drive mechanism is powered by compressed air through nipple 150 in -a manner known by those skilled in the art. The removably attachable portion 130 comprises an object sensor 160 and is removably attachable to housing 112 in any manner as described above. The object sensor 160 may further comprise a light 162 and speaker 164 to alert the tradesman of the presence of a stud, electrical line, or other hidden materials.

Thus, the present invention has many advantages and benefits over the prior art. For example, the present invention provides a means for making a sensor and level readily available to a tradesman.

Alternatively, the object sensor can be designed to attach to the electric power cord and/or the compressed air hose. The object sensor may comprise a trough on any of its surfaces sized to receive the electric power cord and/or compressed air hose. The trough may be sized slightly smaller than the cord and/or hose for secure attachment. Tangs may project from the surface having the trough to partially cover the trough to further secure the cord and/or hose. When the tradesman desires to use the object sensor, he can either use the sensor attached to the cord and/or hose or simply remove the object sensor from the cord and/or cable by gently pulling on the object sensor until it is released. When finished, the tradesman can reattach the object sensor to the cord and/or hose by pressing the cord and/or hose into the trough.

The object sensor may also be attached to the cord and/or hose using a C-shaped clamp that is attached to the housing. The C-shaped clamp may be manufactured out of a resilient plastic or metal such that it flexes to fit over the cord and/or hose and then snaps back securely around the cord and/or hose. The other end of the clamp may be directly attached to the object sensor or connected to the object sensor using a chain or similar device. Similarly, the tradesman may use the object sensor while it is attached to the cord and/or hose or he may remove the object sensor with a gentle pull for use and reattach it to the cord and/or hose when finished using it.

One skilled in the art by devise alternate methods of attaching the object sensor to the cord and/or hose.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

The invention claimed is:

1. A hand-held power tool comprising:
   a. a housing including a drive mechanism and motor provided with a rotary output shaft aligned along a tool axis;
   b. a handle portion aligned along a handle axis, the handle portion having a power activator switch mounted thereon;
   c. a power supply end; and
   d. a removably attachable portion releasably attachable to a portion of one of the housing or the power supply end of the hand-held power tool that is substantially normal to the handle axis, the removably attachable portion comprising an object sensor and a level, wherein the housing comprises outwardly projecting housing flanges and housing grooves and the removably attachable portion comprises two inwardly projecting portion flanges and portion grooves and wherein the flanges and grooves on the housing cooperate with the flanges and grooves on the removably attachable portion to releasably affix the removably attachable portion to the housing.

2. A hand held power tool comprising:
   a. a housing, a drive mechanism contained within the housing,
   b. a handle portion aligned along a handle axis; and
   c. a removably attachable portion removably attachable to a portion of the housing that is substantially normal to the handle axis wherein the removably attachable portion comprises an object sensor and a level and wherein the object sensor has a planar surface that is parallel to the portion of at least one of the housing or the power supply end, wherein the housing further comprises at least one flange formed thereon and the removably attachable portion contains at least one flange and wherein the flanges cooperate to releasably attach the removably attachable portion to the housing.

3. A hand held power tool comprising:
   a. a housing, a drive mechanism contained within the housing,
   b. a handle portion aligned along a handle axis; and
   c. a removably attachable portion removably attachable to a portion of the housing that is substantially normal to the handle axis wherein the removably attachable portion comprises an object sensor and a level and wherein the object sensor has a planar surface that is parallel to the portion of at least one of the housing or the power supply end, wherein the housing comprises outwardly projecting housing flanges and housing grooves and the removably attachable portion comprises two inwardly projecting portion flanges and portion grooves and wherein the flanges and grooves on the housing cooperate with the flanges and grooves on the removably attachable portion to releasably affix the removably attachable portion to the housing.

4. A portable power tool comprising:
   a. a housing comprising a drive mechanism and a motor;
   b. a handle portion attached to the housing and aligned along a handle axis and having a power activator switch mounted thereon, wherein the handle has a power supply end;
   c. a battery engaged with the power supply end and having at least a portion of the battery extending substantially perpendicular to the handle axis; and,
   d. an object sensor attached to a mounting surface on the power supply end that is substantially normal to the handle axis.

5. A power tool comprising:
   a. a housing comprising a drive mechanism and a motor;
   b. a handle portion extending from housing and aligned along a handle axis, the handle portion having a power activator switch and a power supply end;
   c. a battery engaged with the power supply end and having at least a portion of the battery extending substantially perpendicular to the handle axis; and d. an object sensor attached to a portion of the power supply end that is nearly normal to the handle axis.

6. A hand-held power tool comprising:
   a. a housing including a drive mechanism and motor provided with a rotary output shaft aligned along a tool axis;
   b. a handle portion aligned along a handle axis, the handle portion having a power activator switch mounted thereon;
   c. a power supply end; and
   d. a removably attachable portion releasably attachable to a portion of one of the housing or the power supply end of the hand-held power tool that is substantially normal to the handle axis, the removably attachable portion comprising an object sensor and a level, wherein the housing contains a bubble level in a plane essentially perpendicular to the tool axis.

7. A portable hand-held power tool comprising:
   a. a housing including a drive mechanism and motor provided with a rotary output shaft aligned along a tool axis and a handle portion aligned along a handle axis, the handle portion having a power activator switch mounted thereon;
   b. a battery attached to the housing and in electrical connection with the motor for providing electrical power to the drive motor; and
   c. a removably attachable portion releasably attachable to the battery, the removably attachable portion having an object sensor and a level.

8. The hand-held power tool of claim 7 wherein the hand-held power tool is powered by AC energy.

9. The hand-held power tool of claim 7 wherein the hand-held power tool is powered by a battery.

10. The hand-held power tool of claim 7 wherein the hand-held power tools is powered by electrical energy.

11. The hand-held power tool of claim 7 wherein the hand-held power tool is powered by compressed air.

12. The portable hand-held power tool of claim 7 wherein the battery has at least one slot formed thereon for releasably affixing the removably attachable portion to the battery.

13. The hand-held power tool of claim 7 wherein the level is parallel with the tool axis so as to advise of the inclination of the tool axis relative to a horizontal plane.

14. The hand-held power tool of claim 7 wherein the hand-held power tool is a portable drill.

15. The hand-held power tool of claim 7 wherein the hand-held power tool has a rotary shaft.

16. The hand-held power tool of claim 7 wherein the hand-held power tool is a reciprocating saw.

* * * * *